United States Patent [19]
Howard et al.

[11] Patent Number: 5,991,795
[45] Date of Patent: Nov. 23, 1999

[54] COMMUNICATION SYSTEM AND METHODS USING DYNAMIC EXPANSION FOR COMPUTER NETWORKS

[75] Inventors: Michael L. Howard; Christopher S. Sontag, both of Sandy, Utah

[73] Assignee: emWare, Inc., Salt Lake City, Utah

[21] Appl. No.: 08/844,158

[22] Filed: Apr. 18, 1997

[51] Int. Cl.$^6$ .................................................. G06F 13/00
[52] U.S. Cl. ........................... 709/201; 709/202; 709/217
[58] Field of Search .................................. 709/200, 201, 709/202, 203, 212, 213, 217, 218, 219, 225, 226, 230, 300; 707/10, 100, 104

[56] References Cited

U.S. PATENT DOCUMENTS

| | | | |
|---|---|---|---|
| 5,287,507 | 2/1994 | Hamilton et al. | 709/303 |
| 5,442,771 | 8/1995 | Filepp et al. | 709/219 |
| 5,452,447 | 9/1995 | Nelson et al. | 707/205 |
| 5,511,208 | 4/1996 | Boyles et al. | 709/223 |
| 5,568,181 | 10/1996 | Greenwood et al. | 348/7 |
| 5,706,507 | 1/1998 | Schloss | 707/104 |
| 5,881,229 | 3/1999 | Singh et al. | 709/203 |

OTHER PUBLICATIONS

L. Bormann et al., "A Subsystem for Swapping and Mapped File I/O on Top of Chorus," 13th IEEE Int. Conference on Distributed Computer Systems, 1993, pp. 12–19.

A. Tomasic et al., "Caching and Database Scaling in Distributed Shared–Nothing Information Retrieval Systems," Stanford University Department of Computer Science, Report No. STAN–CS–92–1456, 1992.

S. Miller et al., "A Distributed User Information System," Institute for Advanced Computer Studies and Department of Computer Science, University of Maryland, Report No. UMIACS–TR–90–35, 1990.

E. Bertino et al., "Multos: a Document Server for Distributed Office Systems," Lecture Notes in Computer Science 303, Proceedings of the Int. Conference on Extending Database Technology, 1988, pp. 606–615.

K. Kono et al., "Smart Remote Procedure Calls: Transparent Treatment of Remote Pointers," 14th IEEE Int. Conference on Distributed Computer Systems, 1994, pp. 142–151.

"Oracle's Vision of Networked Future," by Martyn Williams, in "Trends," Newsbytes News Network, Oct. 5, 1995.

J. Ordille et al., "Distributed Active Catalogs and Meta–Data Caching in Descriptive Name Services," IEEE Int. Conference on Distributed Computer Systems, 1993, pp. 120–129.

C. Clifton et al., "Distributed Processing of Filtering Queries in HyperFile," 11th IEEE Int. Conference on Distributed Computer Systems, 1991, pp. 54–64.

P. Malkin, "The KCM Distributed Database Management System," IBM Research Report RC 18608 (81416), Dec. 22, 1992.

*Primary Examiner*—Viet D. Vu
*Attorney, Agent, or Firm*—Parsons Behle & Latimer

[57] ABSTRACT

A method for exchange of information between a requesting communication unit and a responding communication unit through an intervening communication unit. The method comprises the steps of transmitting a request for a predetermined information element to the responding communication unit using a first format, intercepting the request for the predetermined information element, searching resources local to the intervening communication unit for the requested predetermined information element, and transmitting the requested predetermined information element to the requesting communication unit. If the requested predetermined information element is not located in local resources, the method includes the steps of translating the request for the predetermined information element into a second format and transmitting the translated request to the responding communication unit, receiving the translated request, transmitting a representation of the requested predetermined information element to the requesting communication unit, intercepting the transmitted representation of the requested predetermined information element, expanding the representation to provide the requested predetermined information element, and transmitting the requested predetermined information element to the requesting communication unit. Apparatus for exchange of information is also described.

28 Claims, 5 Drawing Sheets

COMMUNICATION SYSTEM AND METHODS USING DYNAMIC EXPANSION FOR COMPUTER NETWORKS

FIELD OF THE INVENTION

This invention relates generally to a communication protocol and methodology useful over a computer network, and more particularly to the exchange of information with embedded systems over a computer network, and is more particularly directed toward a method and protocol aimed at minimizing overhead and memory requirements for embedded systems in communication with other computers.

BACKGROUND OF THE INVENTION

In general, the term "embedded system" connotes a combination of computer hardware and software that forms a component of some larger system. Embedded systems are intended to operate without intervention by the larger system of which they form a part, and without the need for frequent control or supervisory inputs from any source. Embedded systems are usually of simple design, and often do not include mass storage components or complex peripherals.

Embedded systems have been placed in vending machines to provide a simple computer network interface to report the need for service or vended product replenishment. Some copying machines in the office environment also utilize embedded systems for reporting of operational status, and embedded systems have been suggested in television set-top boxes designed to provide Internet web browser features through the viewer's television set.

More complex control applications represent a real challenge for embedded systems, however. Because an embedded system generally lacks large-scale storage capability, conventional methods of information interchange that are common over computer networks such as the Internet have generally been eschewed in favor of much simpler protocols.

But the communication capability of the web browser-web server interconnection promises great flexibility for control applications. Graphics-rich web pages with embedded hypertext links offer intuitive status and control environments that are attractive to the designers of embedded control applications.

Caching systems have been suggested as one way to avoid burdening the limited storage capability of embedded systems. In a caching system, a data entity is stored on a system, retrieved, then saved on the referencing device in a cache in order to reduce system overhead in response to subsequent references. However, caching cannot deal with a scenario in which the referenced object has never been stored. Due largely to this limitation, caching is not generally considered appropriate in command and control applications.

Libraries of objects for which a need is anticipated can overcome some of the onerous storage requirements of large objects. But libraries suffer from at least two shortcomings that make their use with embedded systems less attractive.

First, libraries can only store specific objects for which a need is anticipated. A library cannot dynamically support a request for objects of a certain type, for example, rather than a request for an object of a certain name. And, if the requested object type is not located in the library, the library cannot dynamically conduct an ordered search of other libraries in an effort to locate instances of the requested object type, since the order would vary with the type of requested object.

Second, a library cannot store sets of commonly used parameter values, nor can a library make decisions concerning default parameter values, or the best values to use for a given situation described by another set of parameters.

Accordingly, a need arises for an information interchange capability aimed at embedded systems that allows these streamlined microcomputers to implement status and control applications using the graphics capabilities of web browser programs over the Internet and World Wide Web, as well as over other types of computer networks.

SUMMARY OF THE INVENTION

These needs and others are satisfied by the method of the present invention for exchange of information between a requesting communication unit and a responding communication unit through an intervening communication unit. The method comprises the steps of, at the requesting communication unit, transmitting a request for a predetermined information element to the responding communication unit using a first format, at the intervening communication unit, intercepting the request for the predetermined information element, searching resources local to the intervening communication unit for the requested predetermined information element, and, if the predetermined information element is located in local resources, transmitting the requested predetermined information element to the requesting communication unit. Else, if the requested predetermined information element is not located in local resources, the method includes the steps of translating the request for the predetermined information element into a second format and transmitting the translated request to the responding communication unit. At the responding communication unit, additional steps of the method include receiving the translated request, transmitting a representation of the requested predetermined information element to the requesting communication unit, and at the intervening communication unit, intercepting the transmitted representation of the requested predetermined information element, expanding the representation to provide the requested predetermined information element, and transmitting the requested predetermined information element to the requesting communication unit.

The step of transmitting a request for a predetermined information element comprises the step of requesting a predetermined document via HTTP. The step of translating the request for the predetermined information element into a second format comprises the step of translating the request into a protocol that is an enhanced version of HTTP.

In one aspect of the invention, the step of transmitting a representation of the requested predetermined information element comprises transmitting a compressed representation of the requested information element including at least one abridged representation of an object associated with the requested information element. The object associated with the requested information element may comprise an executable program element or an image file, for example.

In another aspect of the invention, the step of expanding the representation comprises the step of dynamically expanding the representation by acquiring referenced objects associated with the requested information element modeled by the representation.

In accordance with one form of the invention, the predetermined information element specifies at least one additional information element, and the method further comprises the steps of, at the requesting communication unit, transmitting a request for the at least one additional information element to the responding communication unit, and, at the intervening communication unit, intercepting the request for the at least one additional information element, extracting search-specific information regarding the at least one additional information element from the intercepted request, conducting a series of searches for the at least one additional information element within a predetermined set of target libraries, wherein library search chronology and specific target library designation are determined by the extracted search-specific information, and, transmitting the at least one additional information element to the requesting communication unit.

The step of transmitting a request for the at least one additional information element comprises the step of transmitting a request for at least one additional document referenced in the originally requested predetermined information element, and the step of extracting search specific information comprises the step of examining document class designations for the additional documents referenced.

In another form of the invention, the step of conducting a series of searches further comprises the steps of, first, searching document libraries on local storage media with order of search determined at least in part by document class designation, and subsequently searching document libraries associated with remote communication units.

In another aspect of the invention, network apparatus for exchange of information comprises means for transmitting a request for a predetermined information element from a requesting communication unit to a responding communication unit using a first format, means for intercepting the request for the predetermined information element at an intervening communication unit, means for searching resources local to the intervening communication unit for the requested predetermined information element, means for determining whether the requested predetermined information element is located in local resources, means for transmitting the requested predetermined information element to the requesting communication unit if the requested predetermined information element is located in local resources, means for translating the request for the predetermined information element into a second format provided that the requested predetermined information element is not located in local resources, means for transmitting the translated request to the responding communication unit, means for receiving the translated request at the responding communication unit, means for transmitting a representation of the requested predetermined information element to the requesting communication unit, means for intercepting the transmitted representation of the requested predetermined information element at the intervening communication unit, means for expanding the representation to provide the requested predetermined information element, and means for transmitting the requested predetermined information element to the requesting communication unit.

The means for transmitting a request preferably comprises a requesting computer system interconnected with the responding communication unit. The requesting computer system may include web browser software. The means for intercepting the request preferably comprises an intervening communication unit interconnected with the requesting communication unit. The intervening communication unit may be a communication unit selected from the group of communication units consisting of a file server, a proxy server, and a common gateway interface.

In yet another aspect of the present invention, a method for implementing an abridged communication protocol for exchange of information among communication units, wherein a designated server communication unit includes, accessible in local storage, a document directory having a symbolic reference to available documents, selected parameter values, and selected operations comprises the steps of, at a requesting communication unit, transmitting a request to the designated server communication unit for a predetermined document defining selected protocol standards, and upon receiving the predetermined document, formatting a request in accordance with the protocol standards, and transmitting the request to the designated server communication unit. The method further includes the steps, at the designated server communication unit, of receiving the transmitted request, extracting request-specific information from the received request, and, if the request is for a document, using a received document identifier as an index into the symbolic reference to available documents, accessing and transmitting the requested document to the requesting communication unit. If the request is for a parameter value, further steps include using a received parameter identifier as an index into the symbolic reference to selected parameter values, accessing and transmitting the requested parameter to the requesting communication unit, and, if the request is for an operation, using a received operation identifier as an index into the symbolic reference to selected operations, performing the selected operation.

The abridged communication protocol may comprise an enhanced version of HTTP. The step of transmitting a request to the designated server communication unit comprises transmitting a request for a capabilities document that includes indicia representing software version and revision level, ordering of data elements, and size of data elements. The symbolic reference to available documents comprises a document directory having a symbol table including entries corresponding to documents, parameter values and operations stored on or recognized by the server communication unit. Documents stored on or recognized by the server communication unit are of a type selected from the set of document types consisting of: static documents, dynamic documents, invocation documents, and variable manipulation documents.

Static documents comprise documents that change only when software version or revision level changes, dynamic documents comprise documents that change from time to time, and each dynamic document includes a stored modification date and a stored revision date, an invocation document invokes an operation, and a variable manipulation document manipulates a parameter value.

In yet another aspect of the invention, the capabilities document is the first ordered document stored on the server and is denominated document 0. The document directory is the second ordered document stored on the server and is denominated document 1. The symbolic reference to selected parameter values is the third ordered document stored on the server and is denominated document 2.

In still another form, a method for providing an abridged reference to information elements exchanged among communication units by representing a selected information element as an ordered sequence of fields, comprises the steps of providing a first field identifying subsequent fields as part of an abridged representation of an information element, providing a second subsequent field identifying a type of information element represented, and providing a third subsequent field identifying a library and an index value into a symbolic representation of library contents.

The step of providing a first field identifying subsequent fields as part of an abridged representation of an information element further comprises the step of providing a first field comprising a predetermined bit pattern. The predetermined bit pattern is selected based upon rarity of occurrence in normal text.

The step of providing a second subsequent field identifying a type of information element represented further comprises the step of identifying a type of information element selected from the group consisting of executable files, image files, rich text files, and configuration files. Executable files may comprise Java applets, and rich text files may comprise files conforming to a mark-up language specification. The mark-up language may comprise HTML.

In yet another aspect of the invention, the step of providing a third subsequent field identifying a library and an index value into a symbolic representation of library contents further comprises the step of providing a first subfield that includes a symbolic library identifier and a second subfield that includes an index value. The index value comprises an integer.

Further objects, features, and advantages of the present invention will become apparent from the following description and drawings.

DETAILED DESCRIPTION OF THE INVENTION

In accordance with the present invention, a protocol and methodology for information interchange for embedded systems communicating over computer networks is described that provide distinct advantages when compared to those of the prior art.

The protocol and methodology described are designed to enable communication between an embedded system and a second computer system with which it is interconnected. However, the protocols and methodologies described are not limited to communication with embedded systems, and may be applied to any interchange of information between data communication units no matter how their interconnection is accomplished.

In one embodiment of the invention, information interchange is described between an embedded system that acts as a web server, and a web browser of conventional design, to achieve the same graphics-rich, robust interface that could be obtained with a conventional web server. In general, the methodology described may be implemented among communication units that are interconnected for the purpose of exchanging information. Such a system of communication units is depicted in block diagram form in FIG. 1.

Figure 1:
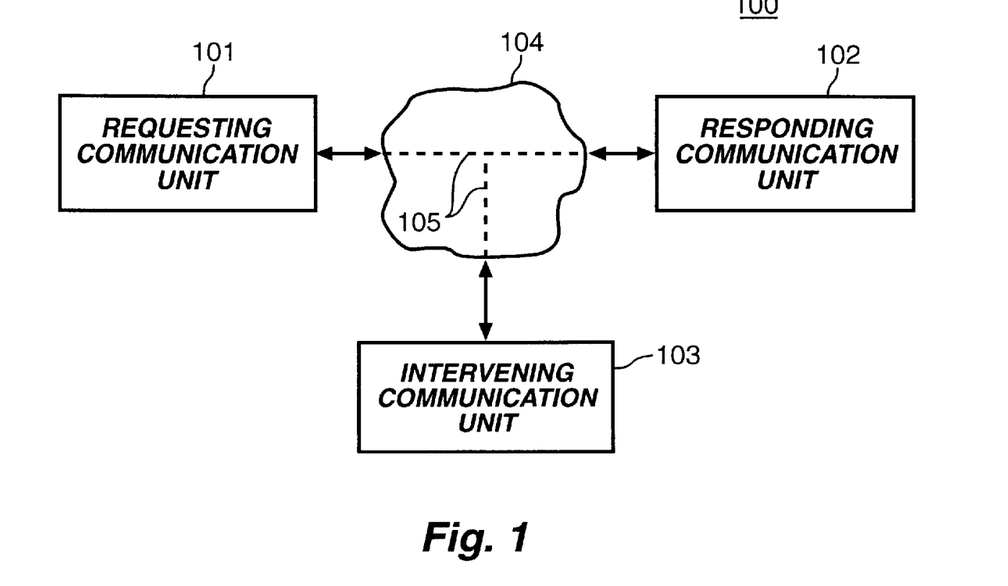
FIG. 1 depicts a system of communication units in block diagram form.

A communication system, generally depicted by the numeral 100, includes a number of communication units 101–103 that are interconnected via an advantageous interface 104. Each of the communication units 101–103 may be a host computer system, a personal computer, a file server, a proxy server, a computer device acting as a common gateway interface (CGI), or a terminal device having varying degrees of "intelligence" as known in the art. Of course, the specific type of communication unit is not limited to the types of devices enumerated here. Each of the communication units 101–103 has the capability of exchanging information with other communication units.

Figure 2:
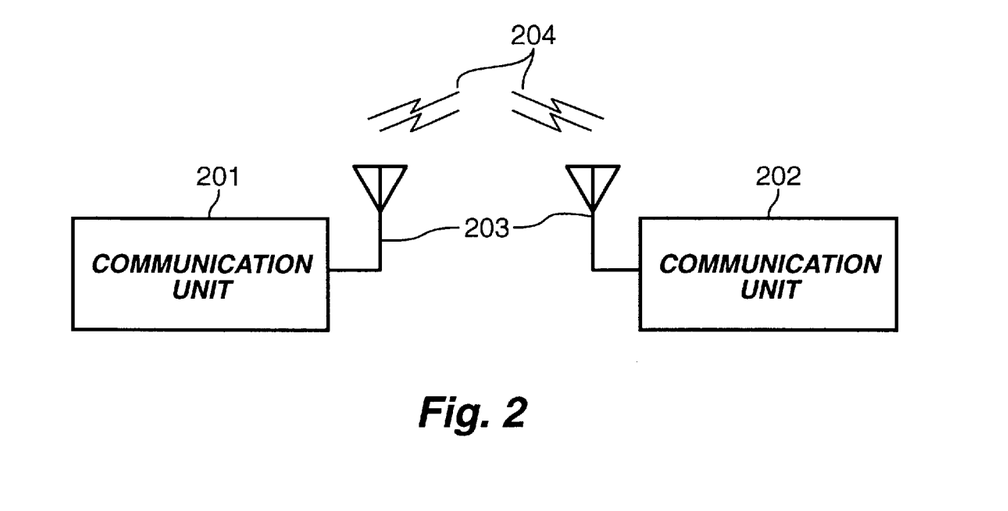
FIG. 2 illustrates communication units exchanging information signals via an RF interconnection.

The specific type of interface or communication channel 104 is not limited to a local area network (LAN) as known in the art. The communication channel 104 may include a wide area network (WAN) as one of its elements, or interconnection among communication units 101–103 may be accomplished in part via the network of computer networks known as the Internet. FIG. 2 illustrates yet another communication channel that may form at least a part of the interface 104 depicted in FIG. 1.

In FIG. 2, communication units 201, 202 are illustrated exchanging information signals 204 via a radio frequency (RF) interconnection through appropriate antenna systems 203 that are suitable for the frequency of interest. This RF communication channel may be implemented via known RF modem technology, with an RF modem replacing the conventional telephone modem often used for intercommunication between computer systems.

Of course, implementation of an RF communication channel is not limited to this suggested combination, and may also include, for example, in whole or in part, point-to-point terrestrial microwave links or satellite links, or hard-wired communication channels provided by coaxial, twisted-pair, or even fiber-optic cable systems. All or part of the interface 104 depicted in FIG. 1 may even be a direct hard-wired connection, as suggested by the dashed lines 105.

One of the communication units 101 may be termed a requesting communication unit when it transmits a request for information to a responding communication unit 102. A third communication unit 103 may be designated an intervening communication unit if it is designed to intercept and potentially reprocess requests for information received from a requesting communication unit 101.

A protocol for the type of communication described above is illustrated in the flow chart of FIG. 3, and generally depicted by the numeral 300. After exiting a START state 301, the requesting communication unit 101 transmits a request for a predetermined information element to the responding communication unit 102 using a first format (step 302).

Figure 3:
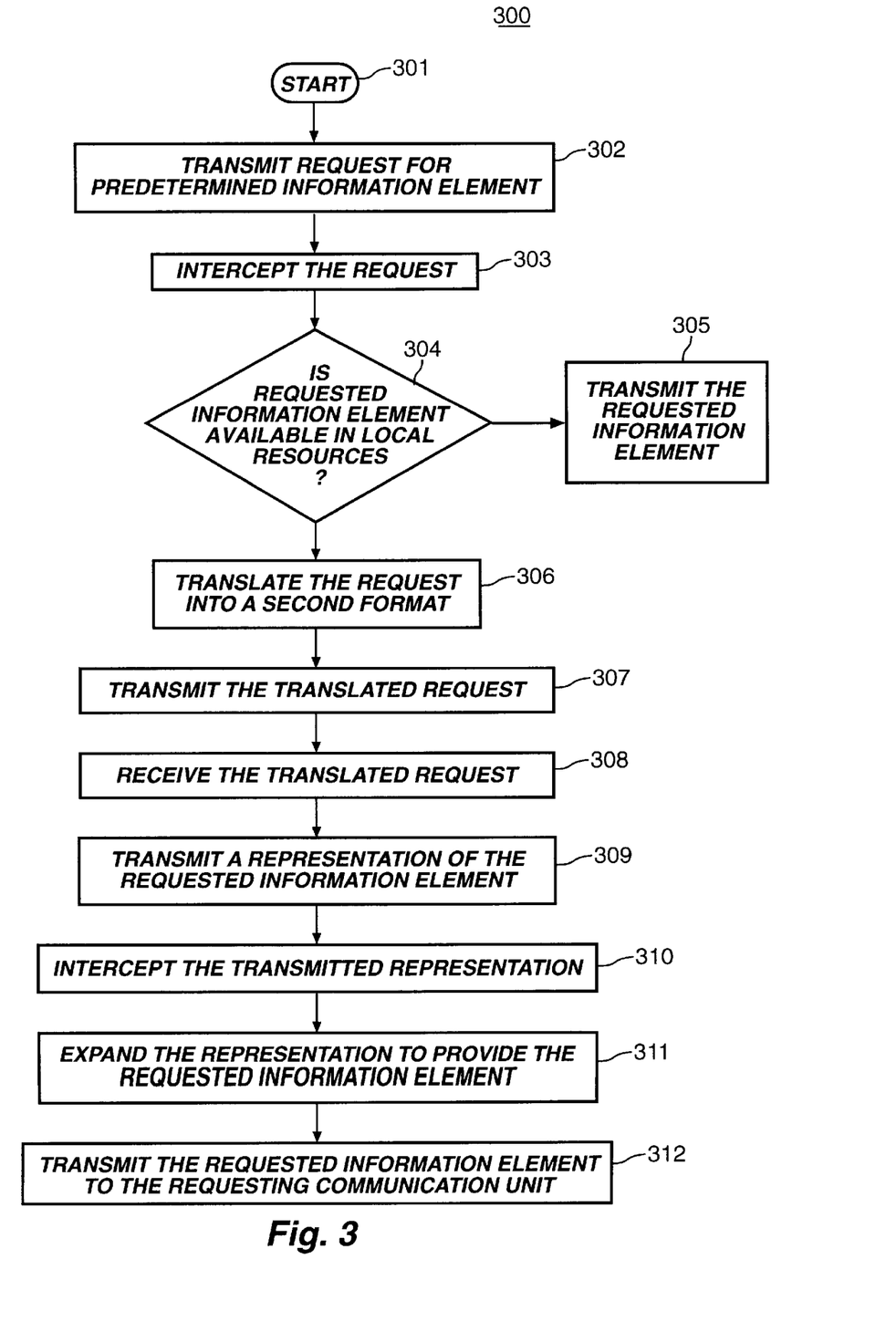
FIG. 3 is a flow chart illustrating a communication protocol.

In the subsequent step 303, the intervening communication unit 103 intercepts the request for the predetermined information element, and, in step 304, searches resources local to the intervening communication unit 103 for the requested information element. These resources may include hard disk storage, random access memory (RAM), read-only memory (ROM), "flash" memory, masked ROM, or various types of archival storage, such as off-line removable disk media or tape drives, for example.

If the requested information element can be located in local resources, the intervening communication unit 103 transmits the requested information element to the requesting communication unit 101 in step 305. If, on the other hand, the requested information element cannot be located, the intervening communication unit 103 translates the request for the predetermined information element into a second format in step 306, and in the subsequent step (307), transmits the translated request to the responding communication unit 102.

The responding communication unit 102 receives the translated request in step 308, and transmits a representation of the requested predetermined information element to the requesting communication unit in the next step (309). In the subsequent operation 310, the intervening communication unit 103 intercepts the transmitted representation of the requested predetermined information element, expands the representation (step 311) to provide the requested predetermined information element, and, in the subsequent operation (312), transmits the requested predetermined information element to the requesting communication unit 101.

The first format in which a transmitted request for information is set may be conventional HTTP, the hypertext transfer protocol developed by Tim Berners-Lee and others at CERN, the European Particle Physics Laboratory, and well-known to those skilled in the art. Of course, the first format is not restricted to HTTP, and may comprise any format suitable for information interchange, including proprietary formats.

The second format into which the intervening communication unit 103 (which may be a proxy server, for example, that knows the network address or other identifier of the responding communication unit) translates the request is preferably an enhanced version of HTTP. This enhanced HTTP isa specialized version of HTTP that relies on a gateway proxy to simplify HTTP and CGI operations at the responding communication unit 102. This is particularly useful when the responding communication unit 102 is an embedded system with limited memory and processing power. In general terms, of course, this second format may be any enhanced version of the first format used.

Enhanced HTTP reduces memory and processing requirements of an embedded web server to a point where small micro-controllers can act as servers using as little as 4k bytes (kilo-bytes) of RAM for program and data storage. As far as run-time performance is concerned, traffic between a web server on the World Wide Web and the intervening communication unit or proxy gateway 103 can be held as closely as possible to purely state and control information.

This traffic reduction results in good performance of a responding communication unit 102 even when used with very slow communication channels. Some of the desirable characteristics of this second format are:

1. The intervening communication unit 103 (proxy) is generally responsible for validation of requests from the requesting communication unit 101 and handling denial of requests where appropriate;

2. Requested information elements such as documents in the intervening communication unit (server) are accessed through an index rather than by name;

3. The commands of the second format directly support function execution and scalar variable manipulation;

4. The intervening communication unit (server), at startup, specifies byte ordering. The intervening communication unit (proxy) is always responsible for any needed translation; and 5. Special handling of variable state updates may be provided.

If the requesting communication unit 101 requires standard HTTP, the intervening communication unit (gateway) can translate enhanced HTTP into standard HTTP and act as a proxy server. Preferably, this translation capability exists regardless of the specific format chosen to be the first format or second format.

A document directory in the form of a symbol table of documents and data functions are stored at the responding communication unit 102 (server) but the server 102 does not have any logic to manipulate the contents of the tables. Instead, the server 102 accesses its documents using a document index. A document stored at a predefined index contains a compressed symbol table that is used by the intervening communication unit 103 to provide access to the documents using symbolic names.

When the requesting communication unit 101 requests a document by name, the intervening communication unit 103 verifies that the document exists, then translates the name to a document number (index). The responding communication unit 102 simply needs to use the number to get the document without needing to handle a case where the document does not exist. Having the intervening communication unit (proxy) 103 handle the name lookup and associated error handling code results in a significant reduction in programming logic requirements at the responding communication unit 102 and is essentially transparent to the requesting communication unit 101.

The familiar HTTP GET operation, for instance, is encoded as:

G1 (Get document 1)

The capital 'G' stands for the enhanced HTTP syntax for GET. The number following the 'G' is a binary encoded unsigned short value that denotes the document number. This number is verified against the symbol table downloaded at connection initialization time. If a file is to be written, then the symbol table must of course have a predefined placeholder.

Documents may be classified into categories:

Static—Only change with product or firmware revision;

Dynamic—May change during system operation. Has a modification and creation date;

Invocation—A function is invoked, not really a document retrieval; and

Variable Manipulation—A variable is manipulated.

Static documents are loaded as needed, but may be cached in a fashion retrievable by the intervening communication unit 103. A cached static document is associated with the product and firmware revision of the device. If these change, then the static document cache must be cleared and reloaded.

A capabilities document is defined as the first (0) document for systems implementing enhanced HTTP as the second format into which requests for information elements are translated by the intervening communication unit 103. This document will define revisions, byte ordering and word size. The byte ordering specification is used by the intervening communication unit 103 (proxy) to translate all data larger than a byte into the ordering native to the responding communication unit or server 102. The word size is used to set the size of integers used in the enhanced HTTP command set.

The enhanced HTTP data tables are as follows:

Static Document Table - These documents do not change.
Document 0: Capabilities document:

-continued

| | |
|---|---|
| UINT8 | major revision |
| UINT8 | minor revision |
| UINT8 | byte ordering type (this is an enumeration of all potential byte ordering variations) |
| The byte ordering type is used to order the following: | |
| UINT16 | Max Message Size |
| UINT32 | Manufacturer ID |
| UINT32 | Product ID |
| UINT32 | Product Revision |
| UINT32 | Firmware Revision |
| Document 1: | Symbol table of all documents on the server |
| UINT8 | Document type (1 or 2) |
| SYMBOL TABLE | |
| Document 2: | Variable Table of all variables accessible through server |
| UINT8 | Document type (1 or 2) |
| VARIABLE TABLE | |

User Documents are numbered 5 and higher.
Variable manipulation and function invocation are available using the following set of data types:
UINT8
INT0
UINT8ARRAY
INT8ARRAY
UINT16
INT16
UINT16ARRAY
INT16ARRAY
UINT32
INT32
UINT32ARRAY
INT32ARRAY
Array encoding [UINT16 length][data]
Length and data are stored in server's native byte order.
The following is a description of enhanced HTTP commands. The command codes are spelled out in words, but are preferably assigned eight-bit constant values. Since the gateway process described above will validate data types and symbol names, there are no response codes provided for simple function invocation or setting a variable's value.

| Code | Description | Response |
|---|---|---|
| [GVER] | Get enhanced HTTP version | [RESP][UINT8 version] |
| [GIDXSZ] | Get Index Size | [RESP][UINT8] |
| [GSD] | Get Static Document<br>[GSD][Index][OFFSET]<br>Index is an index into the static document table.<br>Gateway proxy will have already validated the entry. | [RESP][Contents] |
| [CALL] | Call a function<br>This directly invokes a function in the function table.<br>[CALL][Index]<br>Index is a valid index into the function table. | NONE |
| [CALLP] | Call a function with parameters.<br>[CALLP][Index][parameter1][parameter2]<br>A function parameter list may be specified in the symbol table by extending the name field as follows:<br>    Name?[p1][p2][p3]...[pN]?[r]<br>where "p" and "r" are UINT8 specifying the native type of the parameter/return. | VALUE |
| [SVXXX] | Set Variable<br>[SVXXX][ID][Index][VAL]<br>XXX    One of the supported native data types.<br>ID    An index into the variable table.<br>Index    An index into the function table | NONE |
| [GVXXX] | Get Variable<br>[GVXXX][ID][Index]<br>XXX    One of the supported native data types<br>ID    An index into the variable table.<br>Index    An index into the function table. | VALUE |
| [GVMXXX] | Get Variable if modified<br>[GVMXXX][ID][Index]<br>XXX    One of the supported native data types.<br>ID    An index into the variable table.<br>Index    An index into the function table.<br>This returns the variable if it was modified since the last unconditional get or successful call to GVM. | [No Change] or [Change][VAL] |
| [POST] | Post Document<br>[POST][Index][U32 Length][DATA]<br>Post a new file to the embedded server<br><br>Post is allowed only if the document specified by [Index] has D0 & D1 of the flags set to zero. | [OK] or [ERROR][VAL]<br>VAL:<br>0 - Full<br>1 - not Allowed |

The SV/GV variable, CALL, and POST commands are only present in the server 102 if the symbol tables contain data that may be manipulated through these commands. If, for instance, there are no arrays of data in the embedded application, then the SVINTARRAY type of commands would not be sent from the intervening communication unit 103, so including the code on the responding communication unit (server) 102 to support this would be a waste of space.

The following document types are supported:

```
1   Small Symbol Table (8 bit chars)
    UINT8 - Table Size
    Entries:
        Null Terminated string - Name of document
        UINT8 document number
        UINT8 flags:
            D0 1 = static, 0 = dynamic
            D1 1 = final, 0 = Can be written
            D2–D7 reserved
2   Large Symbol Table (8 bit chars)
    UINT16 - Table Size
    Entries:
        Null Terminated string - Name of document
        UINT8 document number
        UINT8 flags:
            D0 1 = static, 0 = dynamic
            D1 1 = final, 0 = Can be written
            D2–D7 reserved
3   Small Symbol Table (16 bit chars)
    UINT8 - Table Size
    Entries:
        Null Terminated string - Name of document
        UINT8 document number
        UINT8 flags:
            D0 1 = static, 0 = dynamic
            D1 1 = final, 0 = Can be written
            D2–D7 reserved
4   Large Symbol Table (16 bit chars)
    UINT16 - Table Size
    Entries:
        Null Terminated string - Name of document
        UINT16 document number
        UINT8 flags:
            D0 1 = static, 0 = dynamic
            D1 1 = final, 0 = Can be written
            D2–D7 reserved
10  Small Variable Table
        Null Terminated string
        UINT8 - variable type
        UINT8 - Maximum element count (1 for
            scalar)
        UINT8 - SET FUNCTION NUMBER (0 signifies
            simple write)
        UINT8 - GET FUNCTION NUMBER (1 signifies
            simple read)
11  Large Variable Table
        Null Terminated string
        UNSIGNED byte variable type
        UINT16 - Maximum element count (1 for
            scalar)
        UINT16 - SET FUNCTION NUMBER (0 signifies
            simple write)
        UINT16 - GET FUNCTION NUMBER (1 signifies
            simple read)
20  Enhanced HTML (The markup language of enhanced
        HTTP)
21  HTML
30  GIF (Graphics Interchange Format)
31  JPEG (Joint Photographic Experts Group)
```

Of course, the document types illustrated are not intended to exclude other types. The types illustrated merely represent preferred document types.

As discussed previously, the responding communication unit 102 may transmit only a representation of the requested information element. In order to provide an efficient method to specify documents and user interface components inside a micro-controller, a compressed representation format has been devised that may also accommodate references to abridged representations of objects associated with the originally requested information element or document. This compressed representation format is a specification of a file or Java applet that is encoded to save space in the responding communication unit. This compressed representation format also provides a more flexible means of addressing documents than simply by name.

A responding communication unit 102 that is an embedded device may reference HTML, image, or Java class files that reside on a host workstation. These components are generally not specific to a device. Instead, a toolbox of device control, data collection, event handling, and user interface components are preferably made available for the embedded device to use and link to variables or procedures on the device. The purpose of the compressed representation format is to allow specification of these components in a way that minimizes demands on memory in the embedded system. Since the compressed representation format results in abbreviated data elements being transmitted, the demand on interface bandwidth is also minimized.

The process of expanding a compressed representation format to a full HTML reference such as <APPLET . . . > or <HREF . . . > is termed dynamic expansion. The intervening communication unit 103, whether a proxy gateway or file server, expands the compressed representation format and is also responsible for supplying any referenced files.

For a typical World Wide Web browser acting as a requesting communication unit 101, an embedded system as the responding communication unit 102, and a proxy gateway as the intervening communication unit 103, the document retrieval process may be in accordance with the following:

First, the web browser initiates an HTTP GET request. The gateway receives the request, reformats it into enhanced HTTP, and forwards it to the device. The device sends the compressed document. The gateway then decompresses the document, and expands the compressed representation format.

Next, the browser reads the document and does a GET for any needed documents, such as Java class files, that were referenced in the document. The gateway receives the GET request, but looks up and sends the file from its local storage.

A compressed representation format may be placed in a document which is stored in an embedded device. When the document is retrieved from the embedded device, the communications gateway looks for a sequence that identifies the compressed representation format (escape sequence), then reads the group number following the escape sequence.

The group number specifies what type of information element the sequence represents. Using the format specified by the specific group, the compressed representation format is decoded, then expanded into its full textual representation. This full (dynamically expanded) representation is then placed into the document by the gateway before forwarding the document to the software module which originated the document retrieval (the requesting communication unit).

Figure 5:
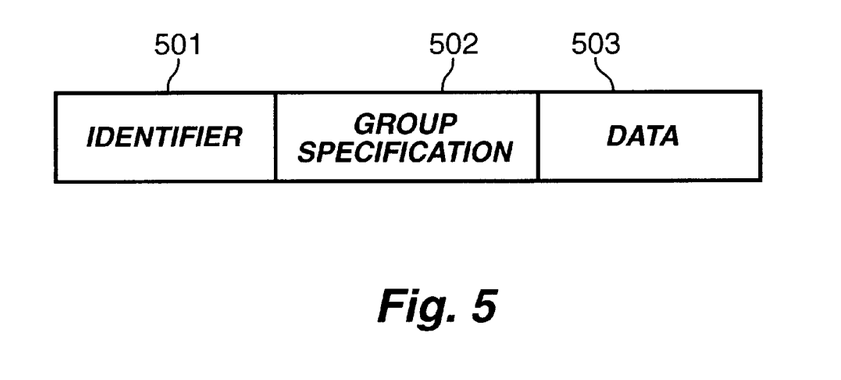
FIG. 5 illustrates the general form of a compressed representation format.

The general form of a compressed representation format (or abridged reference to information elements) is set forth in FIG. 5. The compressed representation format includes an identifier portion 501, a group specification 502, and a data portion 503.

The identifier portion 501 is preferably an escape sequence; that is, a sequence of bits that does not frequently appear in document text. The value of the sequence is repeated twice to represent the sequence when it appears in document text outside of the compressed representation context. The back quote character "`" may be used to refer to this flag, but there is no reason that the escape sequence must be an eight bit value. For convenience of encoding, however, all compressed representation sequences are preferably padded to be a multiple of the number of bits in a character. Since the document may be composed of either eight or sixteen bit characters, the padding may add as much as fifteen bits.

The group specification 502 is used to differentiate which of several types of references this compressed representation (or abridged reference) should expand into. Examples are application specific Java Applet, image file, HTML file, and abridged reference configuration file. Each of these types preferably has a different encoding, which may be represented in the third (data) field 503. The simplest are the image and HTML file formats which preferably look like the following:

`i2

Where:
'—Represents the escape
i—Represents the main image library
2—Specifies the second image in that library.

A practical use of such an abridged representation might be to place a large Icon in a document as a header for a help section. An icon in the image library could be placed into an HTML file using only one or two bytes, for example. Like the escape sequence, the 'i' and the '2' in the tag may be stored in units less than eight bits. The sizes of these fields are partially specified in the document itself. In very memory-constrained systems, the address portions of the abridged representations are reduced in size. In larger systems, the address portions may be made larger.

This abridged representation may be viewed simply as a group of numbers. The image specification is only two numbers; the group number and the image number. Memory constrained devices may be set up to choose from only one of sixteen available groups, and only one of sixteen available images. Thus, in binary, the abridged representation may look like the following:

01100000 0101 0010

The sequence 01100000 is the designated escape sequence, 0101 identifies group number 5 (the image group), and 0010 identifies image number 2.

Figure 6:
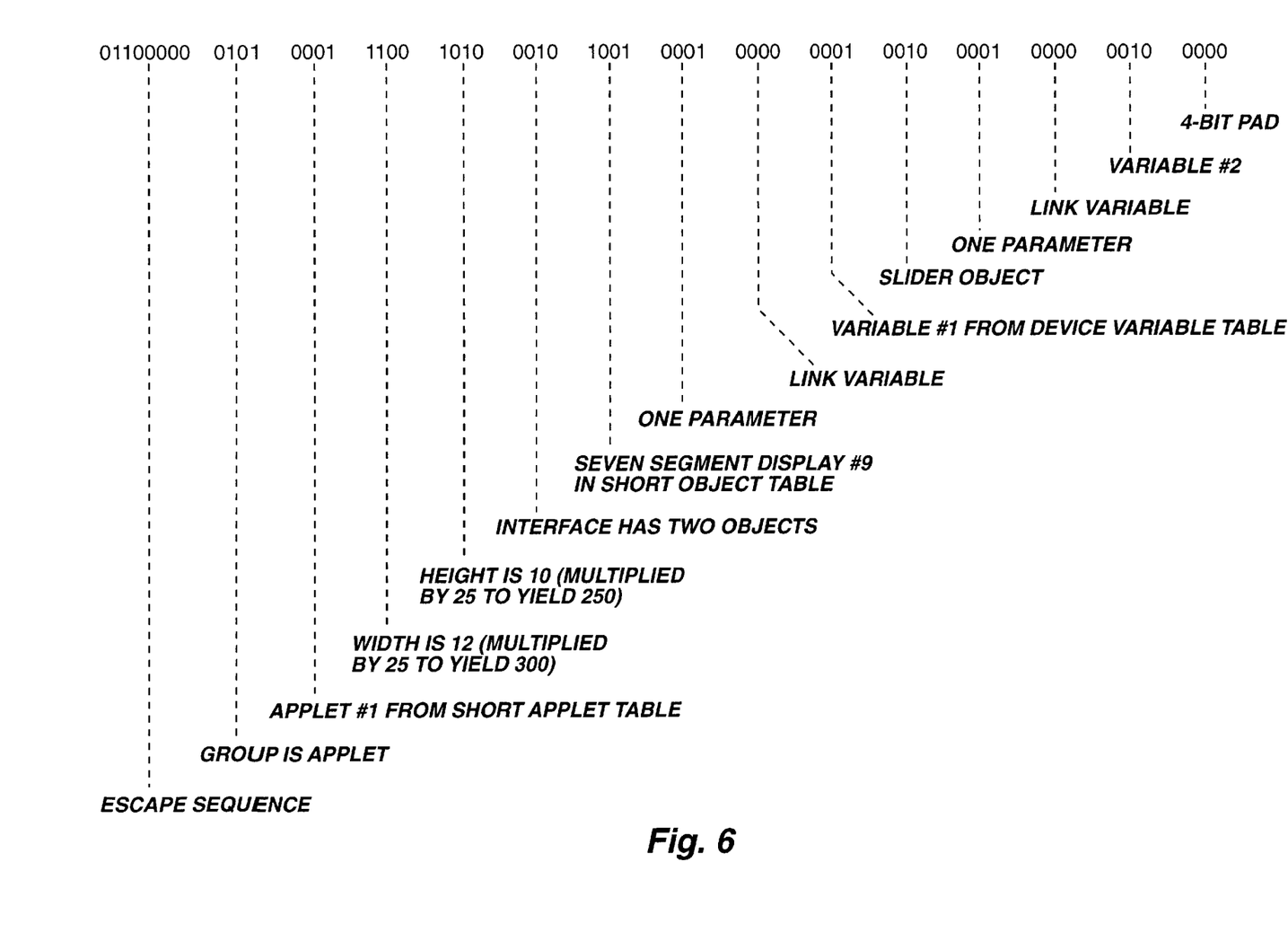
FIG. 6 is illustrates another example of an abridged representation format.

A more complex example of an abridged representation format is set forth in FIG. 6. The representation shown encodes the following information:

```
<APPLET code=emApContainer.class width=300 height=250>
<PARAM name="OBJECTS" value="2">
<PARAM name="OBJECT0" value=
"emJava.emDISPLAYS.em7SegDsp">
<PARAM name="OBJECT0_JRI"value="value_temp">
<PARAM name="OBJECT1" value="emJava.emSliders.emHzSlider">
<PARAM name="OBJECT1_JR1"value="value_intensity">
```

Total Length 300 bytes

Figure 7:
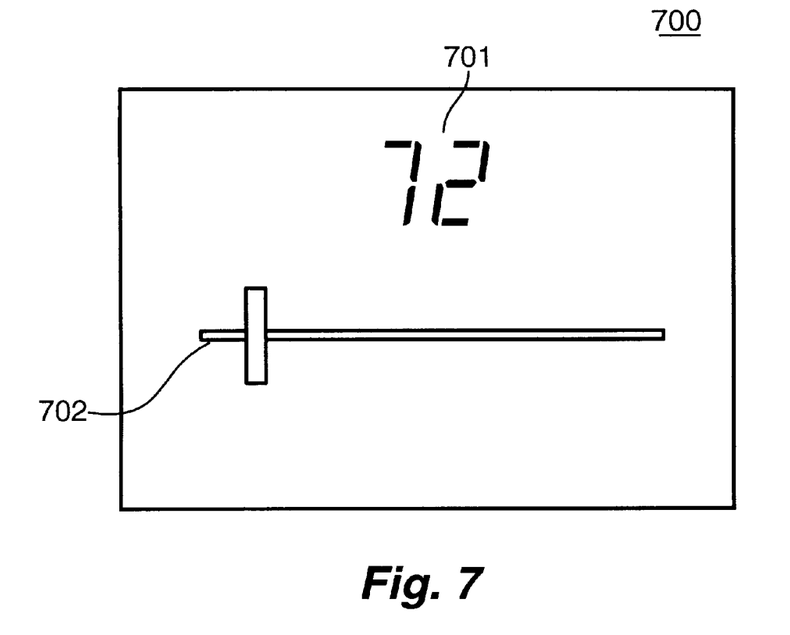
FIG. 7 depicts a control panel.

This applet specification sets up a control panel 700 as illustrated in FIG. 7 that displays a temperature 701 and has a slider control 702 to control light intensity in a demonstration circuit (not shown).

Unlike HREFs and APPLET tags, the abridged representation described can refer to a document type, not just a specific document. If an applet control for a slider is chosen, for example, a request for a specific class will be made to the responding communication unit. The response to the request will be the class file that most closely matches the device being controlled. A default set of Java controls, for example, may be supplied to a user, but a set of specific controls may also be supplied for all projected applications as well as additional sets aimed at specific products.

The abridged representation may directly reference a specific control, or may reference the control for the device. In the latter ease, the intervening communication unit will attempt to retrieve the device control, but will fall back to the set of specific controls, or to the generic set of Java controls if necessary.

The abridged representation described applies to any document type, not just Java class files. A help file, for instance, may give general control usage help for a set of Java class files, but specific device help and contact links for the specific device control.

In addition to referencing a document, the abridged representation may encode most frequently used parameter values. Since the abridged representation is an enumeration, there is no restriction on the interpretation of any given field by the server. The most frequently needed fields are encoded in the first positions, so extremely memory sensitive applications can run using a minimum of document size.

Figure 4:
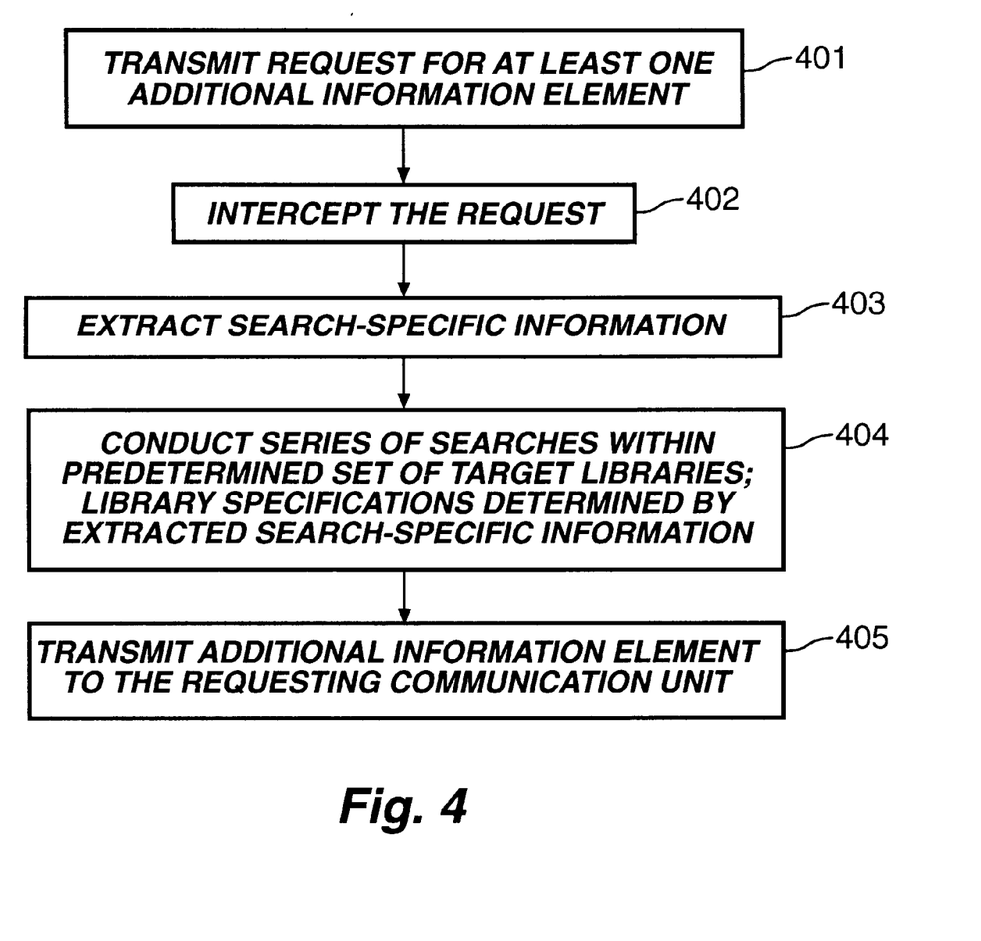
FIG. 4 is a flow chart illustrating a portion of a communication protocol.

FIG. 4 represents, in flow chart form, a portion of a protocol that addresses the situation in which the predetermined information element (document) returned to the requesting communication unit includes a specification of at least one other information element to be retrieved. In step 401, the requesting communication unit transmits a request for the additional information element specified in the originally requested predetermined information element. In the subsequent step (402), the intervening communication unit or proxy 103 intercepts the request for the additional information element, and extracts (step 403) search-specific information regarding the additional information element.

The proxy 103 searches for the additional information element within a predetermined set of target libraries, with specific library designations, search order, and other search parameters based upon the extracted search-specific information (step 405). The proxy then transmits the additional information element to the requesting communication unit in the subsequent step (405).

There have been described herein a protocol and methodology for information interchange for embedded systems communicating over computer networks that are relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A method for exchange of information between a requesting communication unit and a responding communication unit through an intervening communication unit, the method comprising the steps of:
   at the requesting communication unit:
      (a) transmitting a request for a predetermined information element to the responding communication unit using a first format;
   at the intervening communication unit:
      (b) intercepting the request for the predetermined information element;
      (c) searching resources local to the intervening communication unit for the requested predetermined information element; and, if the predetermined information element is located in local resources,
- (d) transmitting the requested predetermined information element to the requesting communication unit; else, if the requested predetermined information element is not located in local resources,
- (e) translating the request for the predetermined information element into a second format; and
- (f) transmitting the translated request to the responding communication unit;

at the responding communication unit:
- (g) receiving the translated request;
- (h) transmitting a representation of the requested predetermined information element to the requesting communication unit;

at the intervening communication unit:
- (i) intercepting the transmitted representation of the requested predetermined information element;
- (j) expanding the representation to provide the requested predetermined information element; and
- (k) transmitting the requested predetermined information element to the requesting communication unit.

2. The method in accordance with claim 1, wherein the step (a) of transmitting a request for a predetermined information element comprises the step of requesting a predetermined document via HTTP.

3. The method in accordance with claim 1, wherein the step (e) of translating the request for the predetermined information element into a second format comprises the step of translating the request into a protocol that is an enhanced version of HTTP.

4. The method in accordance with claim 1, wherein the step (h) of transmitting a representation of the requested predetermined information element comprises transmitting a compressed representation of the requested information element including at least one abridged representation of an object associated with the requested information element.

5. The method in accordance with claim 4, wherein said object associated with the requested information element comprises an executable program element.

6. The method in accordance with claim 4, wherein said object associated with the requested information element comprises an image file.

7. The method in accordance with claim 1, wherein the step (j) of expanding the representation comprises the step of dynamically expanding the representation by acquiring referenced objects associated with the requested information element modeled by the representation.

8. The method in accordance with claim 1, wherein the predetermined information element specifies at least one additional information element, and the method further comprises the steps of:

at the requesting communication unit:
- (l) transmitting a request for said at least one additional information element to the responding communication unit;

at the intervening communication unit:
- (m) intercepting the request for said at least one additional information element;
- (n) extracting search-specific information regarding said at least one additional information element from the intercepted request;
- (o) conducting a series of searches for said at least one additional information element within a predetermined set of target libraries, wherein library search chronology and specific target library designation are determined by said extracted search-specific information; and
- (p) transmitting said at least one additional information element to the requesting communication unit.

9. The method in accordance with claim 8, wherein the step (l) of transmitting a request for said at least one additional information element comprises the step of transmitting a request for at least one additional document referenced in the originally requested predetermined information element.

10. The method in accordance with claim 8, wherein the step (n) of extracting search-specific information comprises the step of examining document class designations for said additional documents referenced.

11. The method in accordance with claim 8, wherein the step (o) of conducting a series of searches further comprises the steps of:
- (o1) first, searching document libraries on local storage media with order of search determined at least in part by document class designation; and
- (o2) subsequently searching document libraries associated with remote communication units.

12. Apparatus for exchange of information comprising:
- means for transmitting a request for a predetermined information element from a requesting communication unit to a responding communication unit using a first format;
- means for intercepting the request for the predetermined information element at an intervening communication unit;
- means for searching resources local to the intervening communication unit for the requested predetermined information element;
- means for determining whether the requested predetermined information element is located in local resources;
- means for transmitting the requested predetermined information element to the requesting communication unit if the requested predetermined information element is located in local resources;
- means for translating the request for the predetermined information element into a second format provided that the requested predetermined information element is not located in local resources;
- means for transmitting the translated request to the responding communication unit;
- means for receiving the translated request at the responding communication unit;
- means for transmitting a representation of the requested predetermined information element to the requesting communication unit;
- means for intercepting the transmitted representation of the requested predetermined information element at the intervening communication unit;
- means for expanding the representation to provide the requested predetermined information element; and
- means for transmitting the requested predetermined information element to the requesting communication unit.

13. The apparatus of claim 12, wherein the means for transmitting a request comprises a requesting computer system interconnected with the responding communication unit.

14. The apparatus of claim 13, wherein the requesting computer system includes web browser software.

15. The apparatus of claim 12, wherein the means for intercepting the request comprises an intervening communication unit interconnected with the requesting communication unit.

16. The apparatus of claim 15, wherein the intervening communication unit comprises a communication unit selected from the group of communication units consisting of:

a file server;

a proxy server; and a common gateway interface.

17. A method for implementing an abridged communication protocol for exchange of information among communication units, wherein a designated server communication unit includes, accessible in local storage, a document directory having a symbolic reference to available documents, selected parameter values, and selected operations, the method comprising the steps of:

at a requesting communication unit:

(a) transmitting a request to the designated server communication unit for a predetermined document defining selected protocol standards; and upon receiving said predetermined document, (b) formatting a request in accordance with the protocol standards; and (c) transmitting the request to the designated server communication unit;

at the designated server communication unit:

(d) receiving the transmitted request;

(e) extracting request-specific information from the received request; and, if the request is for a document, (f) using a received document identifier as an index into the symbolic reference to available documents, accessing and transmitting the requested document to the requesting communication unit; and if the request is for a parameter value, (g) using a received parameter identifier as an index into the symbolic reference to selected parameter values, accessing and transmitting the requested parameter to the requesting communication unit; and, if the request is for an operation, (h) using a received operation identifier as an index into the symbolic reference to selected operations, performing the selected operation.

18. The method in accordance with claim 17, wherein the abridged communication protocol comprises an enhanced version of HTTP.

19. The method in accordance with claim 17, wherein the step (a) of transmitting a request to the designated server communication unit comprises transmitting a request for a capabilities document that includes indicia representing software version and revision level, ordering of data elements, and size of data elements.

20. The method in accordance with claim 17, wherein the symbolic reference to available documents comprises a document directory having a symbol table including entries corresponding to documents, parameter values and operations stored on or recognized by the server communication unit.

21. The method in accordance with claim 20, wherein documents stored on or recognized by the server communication unit are of a type selected from the set of document types consisting of:

static documents;

dynamic documents;

invocation documents; and variable manipulation documents.

22. The method in accordance with claim 21, wherein static documents comprise documents that change only when software version or revision level changes.

23. The method in accordance with claim 21, wherein dynamic documents comprise documents that change from time to time, and each dynamic document includes a stored modification date and a stored revision date.

24. The method in accordance with claim 21, wherein an invocation document invokes an operation.

25. The method in accordance with claim 21, wherein a variable manipulation document manipulates a parameter value.

26. The method in accordance with claim 19, wherein the capabilities document is the first ordered document stored on the server and is denominated document 0.

27. The method in accordance with claim 20, wherein the document directory is the second ordered document stored on the server and is denominated document 1.

28. The method in accordance with claim 20, wherein the symbolic reference to selected parameter values is the third ordered document stored on the server and is denominated document 2.

* * * * *